Jan. 29, 1929.

A. J. SQUIRE ET AL 1,700,186

CREAM AERATOR

Filed March 9, 1928

Patented Jan. 29, 1929.

1,700,186

UNITED STATES PATENT OFFICE.

ALBERT JOHN SQUIRE AND JOHN JULIUS LINDVART, OF KAIKOHE, BAY OF ISLANDS, NEW ZEALAND.

CREAM AERATOR.

Application filed March 9, 1928, Serial No. 260,457, and in New Zealand November 25, 1927.

It is a well known fact that cows' milk is affected by the food eaten by the cows and that the cream separated from such milk contains flavours that are sometimes deleterious in the purposes for which the cream is employed, as for instance, butter making.

It is a common practice therefore to treat the milk, or the separated cream, to an aerating deodorizing process, in which the said deleterious flavours are carried off from the cream, and various special appliances have been devised and used for this purpose.

The object of the present invention is to provide for the aeration of the cream during or immediately subsequent to the separation process in a cream separator, by the combination with a separator of any of the well known forms, of means whereby air currents may be conveyed through or over the cream. These means are operated with the operation of the separator and their use will save the need of the special and separate aeration treatment before mentioned.

The invention consists therefore in the combination with a cream separator of an air fan of approved design that is connected with the bowl spindle of the separator, so that it is driven thereby, and is so positioned that it causes currents of air to be passed through or over the cream as it is contained within or passes away from the separator.

A suitable manner of giving effect to the invention is illustrated in the accompanying drawings, in which:—

A is the separator bowl, which is mounted upon the vertical spindle B within a casing having the cream chamber C with its discharge spout D and into which chamber the cream issues from the bowl A in the well known manner. The bowl is secured upon the spindle top by the bowl nut E.

Figure 1:
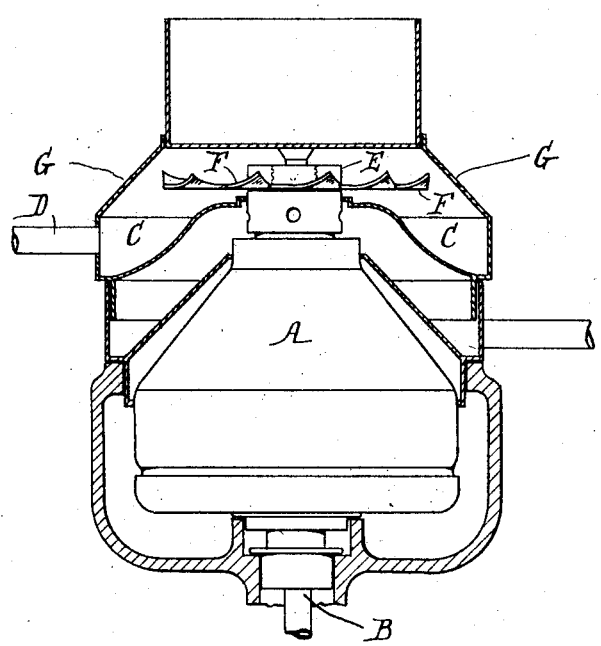
Figure 1 is a vertical section of a separator casing showing the disc bowl arranged therein and also showing the air fan in position.
Figure 2:
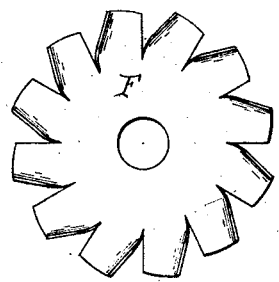
Figure 2 is a plan view of the air fan.

F is the air fan which in this invention is combined with the bowl spindle B and placed within the cream chamber C. Such fan is made of any approved design as for instance of the disc plate shape shown and is secured upon the spindle by placing it between the bowl A and the bowl nut E. The plate is formed with vanes and passages as shown in Figure 2 arranged at the required angles in accordance with ordinary air fan formation practice.

The fan F thus rotates with the bowl spindle, and its vanes are arranged preferably to cause air currents to be circulated within the cream chamber and driven out through the cream spout D so that these act upon the cream globules as they emerge from the bowl, and as the cream trickles out through the spout, and thus aerate the cream in the required manner. If necessary, special air admission apertures G may be made in the separator casing, but in most instances these are not required.

Or, alternatively, the fan vanes may be arranged to cause the air currents to be drawn in through the cream spout and sent out through the bowl and through the milk supply.

We claim:—

1. The combination with a cream separator, of an air fan arranged within the cream chamber thereof and connected with the separator bowl spindle so as to be driven thereby, substantially as and for the purposes specified.

2. In cream separators, the combination with the bowl spindle thereof, of an air fan mounted upon and secured to such spindle and arranged within the cream chamber of the separator, substantially as and for the purposes specified.

In testimony whereof, we affix our signatures.

ALBERT JOHN SQUIRE.
JOHN JULIUS LINDVART.